Patented Mar. 5, 1935

1,993,035

UNITED STATES PATENT OFFICE 1,993,035

METHOD OF PRODUCING A PINENE-MALEIC ANHYDRIDE REACTION PRODUCT

Edwin R. Littmann, Wilmington, Del., assignor to Hercules Powder Company, Wilmington, Del., a corporation of Delaware No Drawing. Application August 26, 1933, Serial No. 687,014

10 Claims. (Cl. 260—123)

This invention relates to a method for the production of a synthetic resin comprising a reaction product of maleic anhydride or equivalently maleic acid and a pinene, such as alpha-pinene, beta-pinene, or the like.

The pinenes, as is well known, are terpene hydrocarbons, which may be obtained from various natural sources. Alpha-pinene is the principal constituent of American turpentine and boils at about 153–157° C. It may be obtained by fractionation of turpentine. Beta-pinene (boiling point about 160–165° C.) occurs in French turpentines and may be obtained by fractionation of this material.

It has been known to react a pinene such as alpha- or beta-pinene with maleic anhydride or equivalently maleic acid in the presence of a catalyst to form a synthetic resin. The presence of a catalyst has always been thought to be essential in effecting this reaction between the pinene and the maleic anhydride.

Now in accordance with this invention it has been found that this catalyst, which may be an acidic catalyst, as, for example, para-toluene sulphonic acid, does not function as a mere catalyst in this reaction. The acid catalyst in addition to whatever true catalytic action it may have, effects the substantal re-arrangement of the pinene into higher boiling terpenes. These higher boiling terpenes are reactive toward maleic anhydride, and consequently the product produced when reacting pinene and maleic anhydride in the presence of an acidic catalyst comprises an impure pinene-maleic anhydride contaminated with various other reaction products.

Now in accordance with this invention, it has been found that contrary to expectation, a catalyst is not essential in the production of a reaction product from a pinene such as alpha- or beta-pinene and maleic anhydride. By causing the reaction to proceed without a catalyst substantial re-arrangement of the pinene is avoided and consequently a pure pinene-maleic anhydride is obtained.

In proceeding for the practical adaptation of the method in accordance with this invention, a pinene such as alpha- or beta-pinene will be reacted with maleic anhydride or with maleic acid, no catalyst being used. The reaction may be effected in any suitable manner, but will preferably be carried out with refluxing in the presence of heat at a temperature of about 150–200° C. If desired, the reaction may be carried out under superatmospheric pressure, in which case the temperature range will be correspondingly increased. In certain cases, fumaric acid, which, as is well known, is converted into maleic-anhydride by heat, may be used in place of maleic anhydride or maleic acid. It is preferable to use an excess of pinene which on completion of the reaction can be distilled off.

As more specifically illustrative of the practical adaptation of the method in accordance with this invention, for example, 41 parts of alpha-pinene and 20 parts of maleic anhydride are mixed and refluxed for three hours. The unreacted volatile material is then removed by vacuum distillation or by distillation with steam and the product, if steam distillation has been used, dried by use of anhydrous sodium sulphate or other dehydrating agent. The crude reaction product may, if desired, be separated into a volatile and non-volatile portion by distillation under a high vacuum. The volatile portion will distil at a temperature of about 148–150° C. at 2 mm. pressure.

Beta-pinene may be substituted for alpha-pinene in the example given above with similar results.

As further illustrative of the method in accordance with this invention, the reaction may be effected by adding to 41 parts of boiling alpha-pinene 20 parts of maleic anhydride in small portions. The alpha-pinene will be kept boiling throughout the entire addition of the maleic anhydride. After completion of the reaction purification is effected as in the example given above. Beta-pinene may be used in place of alpha-pinene if desired.

In proceeding in accordance with the method embodying this invention, it will be understood that maleic acid or fumaric acid may be used in substitution for maleic anhydride though generally the use of maleic anhydride will be preferred. Likewise, the method may be carried out within wide ranges of temperature, it being only necessary to use a temperature at which the reaction will proceed, it being noted that the use of any particular temperature will only affect the rate of reaction and the amount of yield. Further, the method may be carried out with the use of atmospheric or super-atmospheric pressure within a wide range, the effect of super-atmospheric pressure being largely upon the rate at which reaction proceeds.

The product as produced by the method in accordance with this invention comprises a substantially pure pinene-maleic anhydride uncontaminated by any impurities formed as a consequence of re-arrangement of the pinene. The product is a highly acidic material variously usable in the commercial arts and particularly in the formulation of products for use in coating compositions, thermo-plastics, and the like.

The product may be reacted variously with monohydric alcohols such as methyl, ethyl, butyl alcohol, or the like, and may be reacted with various polyhydric alcohols with or without modifying agents such as fatty acids, vegetable oils, resin, etc. for the production of products valuable for use in coating compositions, plastics, etc.

What I claim and desire to protect by Letters Patent is:

1. The method of producing pinene-maleic anhydride which includes reacting substantially pure pinene and maleic anhydride while avoiding the presence of any acidic catalytic material.

2. The method of producing pinene-maleic anhydride which includes reacting substantially pure alpha-pinene and maleic anhydride while avoiding the presence of any acidic catalytic material.

3. The method of producing pinene-maleic anhydride which includes reacting substantially pure beta-pinene and maleic anhydride while avoiding the presence of any acidic catalytic material.

4. The method of producing pinene-maleic anhydride which includes heating together substantially pure pinene and maleic anhydride while avoiding the presence of any acidic catalytic material.

5. The method of producing pinene-maleic anhydride which includes refluxing together substantially pure pinene and maleic anhydride while avoiding the presence of any acidic catalytic material.

6. The method of producing pinene-maleic anhydride which includes heating together substantially pure pinene and maleic acid while avoiding the presence of any acidic catalytic material.

7. The method of producing pinene-maleic anhydride which includes heating together substantially pure pinene and fumaric acid while avoiding the presence of any acidic catalytic material.

8. The method of producing pinene-maleic anhydride which includes heating together under superatmospheric pressure substantially pure pinene and maleic anhydride while avoiding the presence of any acidic catalytic material.

9. The method of producing pinene-maleic anhydride which includes heating together an excess of substantially pure pinene and maleic anhydride while avoiding the presence of any acidic catalytic material.

10. The method of producing pinene-maleic anhydride which includes heating together substantially pure pinene and maleic anhydride while avoiding the presence of any acidic catalytic material, and separating the reaction product into volatile and nonvolatile portions.

EDWIN R. LITTMANN.